(12) United States Patent
Kitamura et al.

(10) Patent No.: US 6,822,799 B2
(45) Date of Patent: Nov. 23, 2004

(54) EXPOSING APPARATUS AND EXPOSING METHOD FOR MICROLENS ARRAY

(75) Inventors: Kazuya Kitamura, Tenri (JP); Kuniaki Okada, Tenri (JP); Yoshihiro Sekimoto, Soraku-gun (JP); Yukio Kurata, Tenri (JP); Hiroshi Nakanishi, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/650,599

(22) Filed: Aug. 27, 2003

(65) Prior Publication Data

US 2004/0051977 A1 Mar. 18, 2004

(30) Foreign Application Priority Data

Sep. 12, 2002 (JP) ........................................ 2002-266558

(51) Int. Cl.[7] ........................ G02B 27/10; G03B 27/54; G03C 5/00
(52) U.S. Cl. ........................ 359/622; 359/621; 359/619; 355/67; 430/321
(58) Field of Search ................................. 359/618, 619, 359/621, 622, 754; 355/53, 67, 71; 356/399–401; 250/548; 216/26; 430/30, 321

(56) References Cited

U.S. PATENT DOCUMENTS 5,633,737 A   5/1997   Tanaka et al. ................ 349/95

2004/0099633 A1 * 5/2004 Okada et al. ................. 216/26

FOREIGN PATENT DOCUMENTS

JP        2000-098102        4/2000

\* cited by examiner

Primary Examiner—Georgia Epps
Assistant Examiner—Jack Dinh
(74) Attorney, Agent, or Firm—David G. Conlin; William J. Daley, Jr.; Edwards & Angell, LLP

(57) ABSTRACT

An exposing apparatus for a microlens array allows for easy alignment and attains high accuracy. An exposing method for a microlens array attains high accuracy and high light efficiency. The exposing apparatus for a microlens array includes a micro fly-eye lens for converting a light beam from a light source into a secondary point light source, a transmittance distribution mask for adjusting the luminance of the light of the secondary point light source, and a collimator lens for converting the light of adjusted luminance into a parallel light beam and for guiding the parallel light beam, via a first microlens array which is formed in advance, to a photosensitive resin layer to be a second microlens array. The light emitted from the light source is transmitted through the micro fly-eye lens, the transmittance distribution mask, and the collimator lens. The light is then adjusted to a desired luminance to expose the photosensitive resin of a microlens substrate.

28 Claims, 11 Drawing Sheets

TRANSMITTANCE

TRANSMITTANCE

EXPOSING APPARATUS AND EXPOSING METHOD FOR MICROLENS ARRAY

FIELD OF THE INVENTION

The present invention relates to an exposing apparatus and an exposing method for a microlens array used in a liquid crystal panel and the like.

BACKGROUND OF THE INVENTION

Projection-type liquid crystal display apparatuses have advantages over projection-type cathode-ray tube display apparatuses in that the projection-type liquid crystal apparatuses have a wider color reproduction range, are highly portable because of their small size and light weight, and require no convergence adjustment because the projection-type liquid crystal apparatuses are not influenced by earth magnetism. Moreover, larger screens can easily be attained in the projection-type liquid crystal apparatuses. Therefore, the projection-type liquid crystal apparatuses are expected to be a mainstream of future home image display apparatuses.

There are two types of projection-type color image display systems using liquid crystal display elements: a three-plate system, in which three plates of liquid crystal display element are respectively used for three primary colors; and a single-plate system, in which only a single plate is used. The three-plate system uses an optical system and three plates of liquid crystal display element. The optical system divides white light into three primary colors of R, G, and B. The three plates of liquid crystal display element form images by respectively controlling the light of three primary colors. The images of the three primary colors are then optically superimposed, so as to perform full-color display.

Advantages of the three-plate system are that the light emitted from a white light source can be effectively utilized, and that color purity is high. However, the three-plate system requires a color separating system and a color combining system, as described above. This causes the optical system to be complex, because a large number of parts are required. As a result, it is difficult to attain miniaturization and low cost.

On the other hand, the single-plate system uses only a single plate of liquid crystal display element. In the single-plate system, light is projected on the single plate of liquid crystal display element, which includes a three-primary-color color filter pattern of a mosaic-shape, stripe-shape, or the like, using a projecting optical system. The single-panel system is suitable for low-cost and small-sized projector systems, because only a single plate of liquid crystal display element is used, and because the arrangement of the optical system is simpler than that of the three-panel system.

However, in the single-panel system, the light is absorbed or reflected by the color filter. As a result, only approximately one-third of incident light can be utilized. To overcome this drawback, a color-filter-less liquid crystal display apparatus of a single-panel system using bilayered microlens array has been proposed (see, for example, Japanese Publication for Unexamined Patent Application No. 181487/1995 (Tokukaihei 7-181487; publication date: Jul. 21, 1995), a Japanese equivalent to the U.S. Pat. No. 5,633,737).

In this apparatus, the white light emitted from a white light source is divided into colors of R, G, and B by a dichroic mirror disposed in a sector form. Then, the light of three primary colors are respectively incident at different angles on a microlens array disposed on the light-source-side of a liquid crystal display element. Each light beam transmitted through the first microlens array is then refracted by the second microlens array, so that the key light of R, G, and B, which have been produced by the dichroic mirror, become substantially parallel. Then, the refracted light beams are projected onto portions of the liquid crystal to be driven by signal electrodes, to which color signals respectively corresponding to the key light of R, G, and B are applied respectively.

In this apparatus, no absorber-type color filter is used. Therefore, light is more efficiently utilized. Besides, since the key light beams of R, G, and B are substantially parallel, the key light beams of R, G, and B do not spread significantly before reaching a projection lens. Moreover, it is possible to provide a very bright image because an amount of light does not decrease through the projection lens.

Here, the second microlens needs to have a large refracting power in order to deflect the key light of G and B parallel to the key light of R. The second microlens is therefore thick, and pixels are arranged in a mosaic-shape. Further, a vertical wall needs to be provided, which causes a problem of proportional decrease in light efficiency when there is a tilt in the vertical wall. No specific manufacturing method or exposing method is disclosed.

With regard to a method for fabricating a bilayered microlens array, there has been proposed a method in which a first layer is formed by 2P molding, and a second layer is molded using the same stamper mold that is used for the first layer and using a material whose refractive index is different from that of the material used for the first layer (see, for example, Japanese Publication for Unexamined Patent Application No. 98102/2000 (Tokukai 2000-98102; publication date: Apr. 7, 2000)).

However, the method for fabricating a bilayered microlens array has the following problem. In performing molding, the stamper mold is moved up and down using a bearing having excellent straightness. Here, the accuracy of alignment between the first microlens and the second microlens in an in-plane direction depends on the accuracy of the bearing. Therefore, it is difficult to meet a required specification, i.e., to keep the accuracy of alignment within ±10% from the pixel pitch. If misalignment occurs beyond this range, the light efficiency drastically decreases. Besides, a light beam enters an adjacent pixel. As a result, a so-called color mixture is caused, thereby drastically impairing image quality.

In order to minimize misalignment, it is necessary to mold the second microlens with the substrate and the stamper mold held in place in the apparatus after molding the first microlens. Because of this, the first microlens and the second microlens have the same shape. That is, freedom of design necessary for attaining optimal light efficiency is not present. Therefore, the shapes disclosed in Tokukaihei 7-181487 cannot be formed. As a result, sufficient properties cannot be attained.

Moreover, the refractive index of the second microlens needs to be larger than that of the first microlens, and the refractive index of the substrate needs to be larger than that of the second microlens. However, the refractive index of the UV resin can vary only within a limited range. Therefore, the refractive indices on the respective lens surfaces cannot differ by a sufficient margin. As a result, lenses having a short focal length cannot be fabricated.

In addition, in a method using a mold, such as the 2P method or an injection molding method, the formation of the vertical wall poses difficulties in molding, and even when the vertical wall is successfully formed, the method causes damage on a lens portion when the microlens array is detached from the mold. There has been no exposing apparatus that can solve these problems.

SUMMARY OF THE INVENTION

The present invention was made to solve the problems above. An object of the present invention is to provide an exposing apparatus for a microlens array that allows for easy alignment and attains high accuracy, and to provide an exposing method for a microlens array that attains high accuracy and high light efficiency.

To solve the problems above, in the present invention, an exposing apparatus for a microlens array includes: a secondary point light source generating section for converting a light beam from a light source into secondary point light sources; a luminance adjustment section for receiving light of each secondary point light source and adjusting luminance of the light; and a parallel light beam generating section for converting the light with adjusted luminance into a parallel light beam, and guiding the parallel light beam, via a first microlens array which is formed in advance, to a photosensitive resin layer to be a second microlens array.

According to the invention, the light beam from the light source is incident on the secondary point light source generating section, and is converted into secondary point light sources. The light beams of the respective secondary point light sources are incident on the luminance adjustment section, and the luminances of the respective light beams are adjusted therein. With this arrangement, the point light sources function as point light sources having variable luminances. Therefore, it is possible to adjust the luminances of the light beams incident on the photosensitive resin layer.

The light of adjusted luminance is incident on the parallel light beam generating section, and is converted into parallel light beams therein. The light converted into parallel light beams is incident on the first microlens array, which is formed in advance, and is refracted, condensed, and guided to the photosensitive resin layer. In this way, the photosensitive resin layer is exposed with high accuracy. By thus exposing the photosensitive resin layer, the second microlens array is formed.

The incident angles of the light guided from the parallel light beam generating section to the second microlens array depend on the position of the secondary point light source emitted by the secondary point light source generating section. The illuminance of each parallel light beam on the second microlens array (illuminance of the parallel light beam on the photosensitive resin layer) can be varied by the adjustment by the luminance adjustment section.

With this arrangement, the second microlens array can be fabricated with high accuracy, without requiring a conventional complex alignment step, in which the first microlens and the second microlens are aligned in the in-plane direction by moving a stamper mold up and down using a bearing in performing molding. This drastically improves light efficiency of the microlens array. Moreover, this prevents the color mixture that occurs when the light beam enters an adjacent pixel. As a result, image quality is drastically improved.

Moreover, designing of the microlens array is no longer restricted by the alignment step, because the illuminances on the photosensitive resin layer are adjusted by the luminance adjustment section. Therefore, freedom of design, which is necessary to optimize light efficiency, can be drastically improved. In addition, the refractive indices on the respective lens surfaces can differ by a sufficient margin. As a result, it is possible to fabricate lenses having a short focal length. Furthermore, the formation of the vertical wall is no longer required, because the conventional mold-processing is no longer required. As a result, it is possible to successfully overcome the conventional problem that the lens section is damaged when detached from the mold.

To solve the problems above, in the present invention, an exposing method for a microlens array includes the steps of: (1) converting a light beam having substantially uniform radiant intensity into secondary point light sources; (2) adjusting a luminance of light of the secondary point light source, so that the luminance matches a shape of the microlens array to be formed; and (3) converting the light of the secondary point light source into a parallel light beam, the parallel light beam passing through the microlens array to expose a photosensitive resin layer.

According to the method, the luminances of the light beams of the respective secondary point light sources are adjusted. Therefore, the point light sources function as point light sources having variable luminances. As a result, it is possible to desirably adjust the luminances of the light beams projected on the photosensitive resin layer.

The light of adjusted luminance is converted into parallel light beams. Then, the parallel light beams are refracted and condensed, and are guided to the photosensitive resin layer to be the microlens array. In this way, the photosensitive resin layer is exposed with high accuracy.

The incident angle of the parallel light beam into the microlens array depends on the position of the secondary point light source. The illuminance of the parallel light beam on the microlens array (illuminance of the parallel light beam incident on the photosensitive resin layer) can be varied by adjusting the luminance.

With this arrangement, the second microlens array can be fabricated with high accuracy, without requiring a conventional complex alignment step, in which the first microlens and the second microlens are aligned in the in-plane direction by moving a stamper mold up and down using a bearing in performing molding. This drastically improves light efficiency of the microlens array. Moreover, this prevents the color mixture that occurs when the light beam enters an adjacent pixel. As a result, image quality is drastically improved.

Moreover, designing of the microlens array is no longer restricted by the alignment step, because the illuminances on the photosensitive resin layer are adjusted by the luminance adjustment section. Therefore, freedom of design, which is necessary to optimize light efficiency, can be drastically improved. In addition, the refractive indices on the respective lens surfaces can differ by a sufficient margin. As a result, it is possible to fabricate lenses having a short focal length. Furthermore, the formation of the vertical wall is no longer required, because the conventional mold-processing is no longer required. As a result, it is possible to successfully overcome the conventional problem that the lens section is damaged when detached from the mold.

For a fuller understanding of the nature and advantages of the invention, reference should be made to the ensuing detailed description taken in conjunction with the accompanying drawings.

DESCRIPTION OF THE EMBODIMENTS

[First Embodiment]

Figure 1:
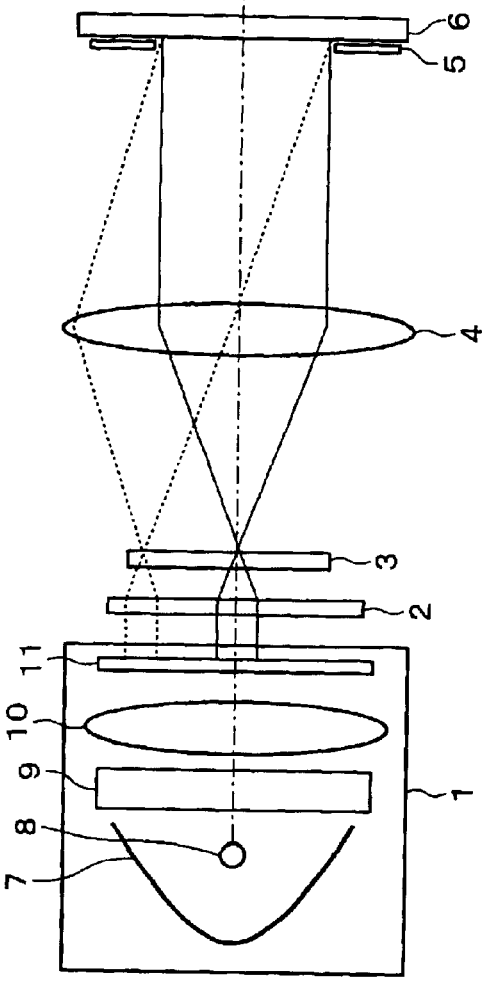
FIG. 1(a) shows an arrangement of an exposing apparatus for a microlens array in one embodiment of the present invention.
FIG. 1(b) is a side view showing an arrangement of an exposing apparatus for a microlens array in another embodiment of the present invention.
Figure 1:
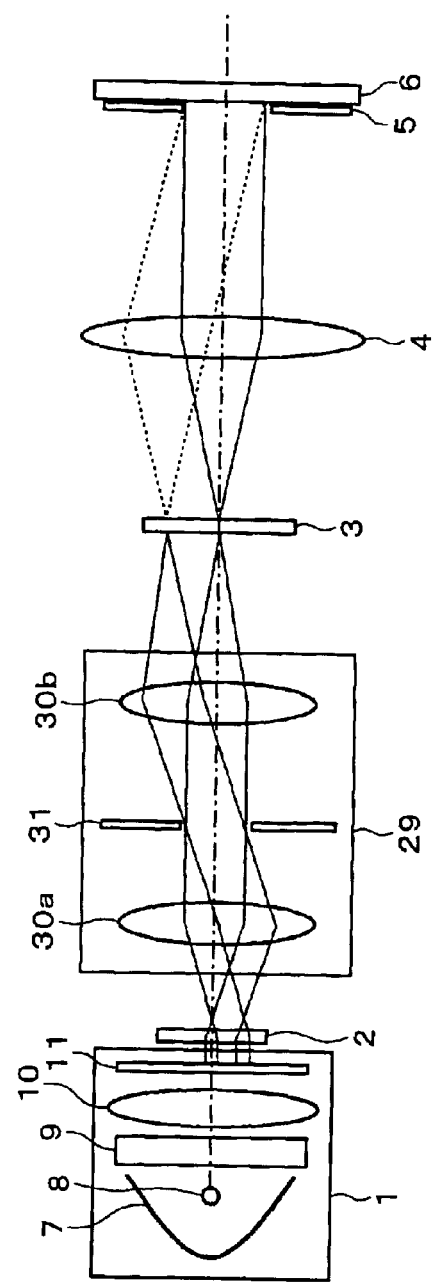

With reference to FIG. 1(a), a first embodiment of the present invention is described below.

FIG. 1(a) is a block diagram illustrating an exposing apparatus according to the present invention for manufacturing a microlens array.

As shown in FIG. 1(a), the exposing apparatus for a microlens array includes a light source unit (light source) 1, a micro fly-eye lens (secondary point light source generating section) 2, a transmittance distribution mask (luminance adjustment section) 3, a collimator lens (parallel light beam generating section) 4, and a microlens substrate aperture (aperture member) 5. A microlens substrate 6, which is exposed by the exposing apparatus for a microlens array, is provided in proximity to the microlens substrate aperture 5.

The light source unit 1 emits light for exposing the microlens array. The light source unit 1 includes an ellipsoidal mirror 7, a high-pressure mercury lamp 8, an integrator 9, a condensing lens 10, and a wavelength-selective filter 11.

The ellipsoidal mirror 7 has a condensing function, and condenses light emitted from the high-pressure mercury lamp 8.

The integrator 9 provides a uniform illuminance distribution for the light emitted from the high-pressure mercury lamp 8 and for the light condensed by the ellipsoidal mirror 7. Although the fly-eye lens is used in the present embodiment, a rod integrator may be used instead of the fly-eye lens.

The condensing lens 10 converts the light that has passed through the integrator 9 into parallel beams.

The wavelength-selective filter 11 passes only a particular wavelength of the light that has passed through the condensing lens 10. In the present embodiment, the wavelength-selective filter 11 passes only the light having a wavelength of an i ray (in the vicinity of 365 nm), in accordance with the photosensitive wavelength properties of a negative resist, which is the target of exposure (photosensitive resin). It should be noted here that the wavelength-selective filter 11 may pass light of a different wavelength, in accordance with the wavelength properties of the exposure target.

The micro fly-eye lens 2 provides uniform light intensity for the light beam emitted from the light source unit 1. The micro fly-eye lens 2 is a collection of two-dimensionally disposed lenses having a condensing function. The parallel beam emitted from the light source unit 1 is converted into secondary light sources through the micro fly-eye lens 2.

The transmittance distribution mask 3 is provided at a position where the secondary light sources that have passed through the micro fly-eye lens 2 are located. The transmittance distribution mask 3 is a photomask with a transmittance distribution for the i ray and for each lens of the microlens array. The transmittance distribution mask 3 modulates light intensity of each secondary point light source according to the transmittance of the transmittance distribution mask 3, so that the secondary point light source has a predetermined luminance. The transmittance distribution of the transmittance distribution mask 3 is determined in accordance with the luminance of the light source unit 1, the illuminance distribution on the transmittance distribution mask 3, and the photosensitive properties of the negative resist, i.e., the exposure target.

The collimator lens 4 converts light of the secondary light sources that have passed through the transmittance distribution mask 3 into parallel beams. The light of the secondary light sources that were converted into parallel beams by the collimator lens 4 are incident on the microlens array substrate 6 through the microlens substrate aperture 5.

According to the foregoing arrangement, the following describes a mechanism by which the exposing apparatus for a microlens array according to the present invention exposes the microlenses.

The integrator 9 provides a uniform illuminance distribution for the light emitted by the high-pressure mercury lamp 8 and for the light condensed by the elliptic mirror 7. The condensing lens 10 then converts the light of uniform illuminance distribution into a parallel beam. Then, the wavelength-selectve filter 11 passes only the light of a wavelength in the vicinity of the i ray of the parallel beam that has passed through the condensing lens 10. The light source unit 1 thus emits a parallel beam.

The parallel beam emitted by the light source unit 1 is converted by the micro fly-eye lens 2 into secondary-light sources, and forms point light sources, the number of which is equal to the number of lenses in the micro fly-eye lens 2, on the posterior focal points of the micro fly-eye lens 2. The transmittance distribution mask 3 is disposed such that the secondary point light sources that are formed by the micro fly-eye lens 2 are located on the transmittance distribution mask 3. The transmittance distribution of the transmittance distribution mask 3 is determined in accordance with the luminance of the light source unit 1, the illuminance distribution on the transmittance distribution mask 3, and the photosensitive properties of the negative resist, i.e., the exposure target.

By disposing the transmittance distribution mask 3 at a position where the secondary light sources are located, the secondary light sources pass through the transmittance distribution mask 3 as small beam spots, i.e., the secondary point light sources. At this stage, the intensity of each secondary point light source is modulated, so that the secondary point light source acts as a point light source with a predetermined luminance.

The secondary point light sources are converted by the collimator lens 4 into parallel beams. Then, the parallel beams are incident on the microlens substrate 6 through the microlens substrate aperture 5.

The secondary point light source that lies on the optical axis of the collimator lens 4 is projected on the microlens substrate 6 as a parallel beam parallel to the optical axis. The secondary point light source that is off the optical axis of the collimator lens 4 is projected on the microlens substrate 6 as a parallel beam having a certain angle with respect to the optical axis. The certain angle is denoted by a that satisfies the following equation:

(The distance between the optical axis and the secondary point light source off the optical axis)=(the focal length of the collimator lens 4)×tan α     (1).

Therefore, the angle created by the parallel beam with respect to the optical axis of the collimator lens, i.e., the angle of incidence with respect to the microlens array, depends on the position of the secondary point light source. Moreover, the illuminance of the parallel beam on the microlens substrate 6 can be varied by adjusting the luminance of the secondary point light source, i.e., the transmittance of the transmittance distribution mask 3.

Moreover, the microlens substrate aperture 5 may be adapted to have a rectangular opening having a size of one chip of a liquid crystal panel, so that each chip can be exposed by a single irradiation of exposure light. In this case, in an arrangement where a plurality of chips are mounted on one wafer, it is possible to expose the plurality of chips by a step-and-repeat method. With this arrangement, a precision microlens array can be fabricated at high speed, even if uniformity cannot be ensured for the irradiated exposure light over a large area of the microlens substrate 6.

Next, described below is a method for fabricating a bilayered microlens array by exposing the microlens substrate 6 with the exposing apparatus of the present embodiment for fabricating a microlens array.

Figure 2:
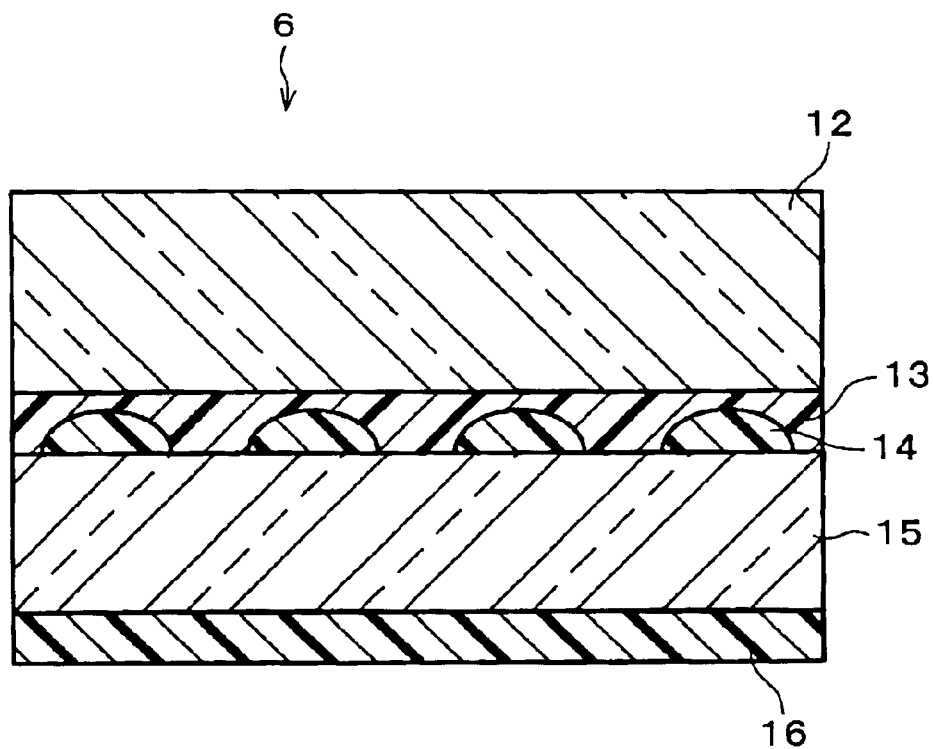
FIG. 2 is a cross-sectional view showing an arrangement of a microlens substrate in the embodiments of the present invention.

First, an arrangement of the microlens substrate 6 used in the fabrication method of a microlens array according to the present invention is described. As shown in FIG. 2, the microlens substrate 6 includes a first substrate 12, an intermediate resin layer 13, a first microlens array 14, a second substrate 15, and a negative resist 16.

The first substrate 12 and the second substrate 15 are made of silicon dioxide, or a material with low expansibility such as glass or ceramic. The intermediate resin layer 13 is made of ultraviolet curable resin of a low refractive index. The first microlens array 14 is made of ultraviolet curable resin of a high refractive index. The difference between the refractive index of the intermediate resin layer 13 and that of the first microlens array 14 is approximately 0.18.

The first microlens array 14 is formed by a photo-polymer method (2P method). The stamper used in the 2P method is made of silicon dioxide or Ni, and has been processed to have a shape of the lenses of the first microlens array 14 to be formed. The stamper may be fabricated by reflowing, wet etching, dry etching or the like method, so as to form the first microlens array 14 by one of these methods, instead of the 2P method.

The first microlens array 14 has a light condensing function. The light condensing function is optimized for an average wavelength (for example, an e ray) of light in the visible light range. Even though the i ray is used to expose the microlens substrate 6, the first microlens array 14 has a sufficient condensing capability also for the i ray, because the intermediate resin layer 13 and the first microlens array 14 do not significantly differ in chromatic dispersive power.

The negative resist 16 is applied on the second substrate 15 of the microlens substrate 6. The negative resist 16 has a thickness that corresponds to the height of a second microlens array to be formed by a later process (described later). The thickness is determined by the ratio of etching rates for the second substrate 15 and the negative resist 16 in dry etching performed in forming the second microlens array, and by the height of the second microlens array.

Next, with reference to FIGS. 3(a), 3(b), and 4, a method for forming the second microlens array using the microlens substrate 6 is described below.

Figure 3:
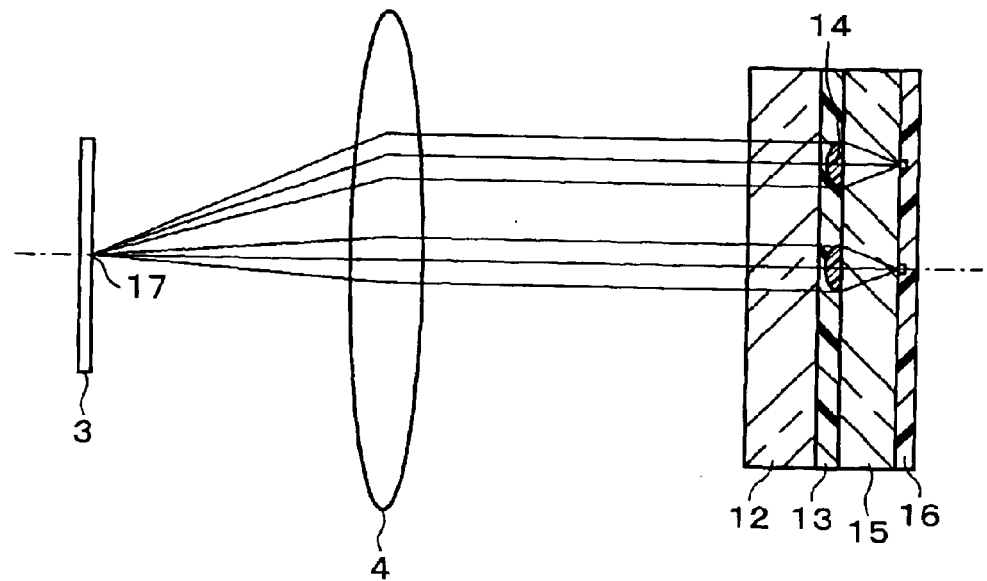
FIGS. 3(a) and 3(b) are cross-sectional views showing how light is focused by an optical system including a collimator lens and a first microlens array in the embodiments of the present invention.
Figure 3:
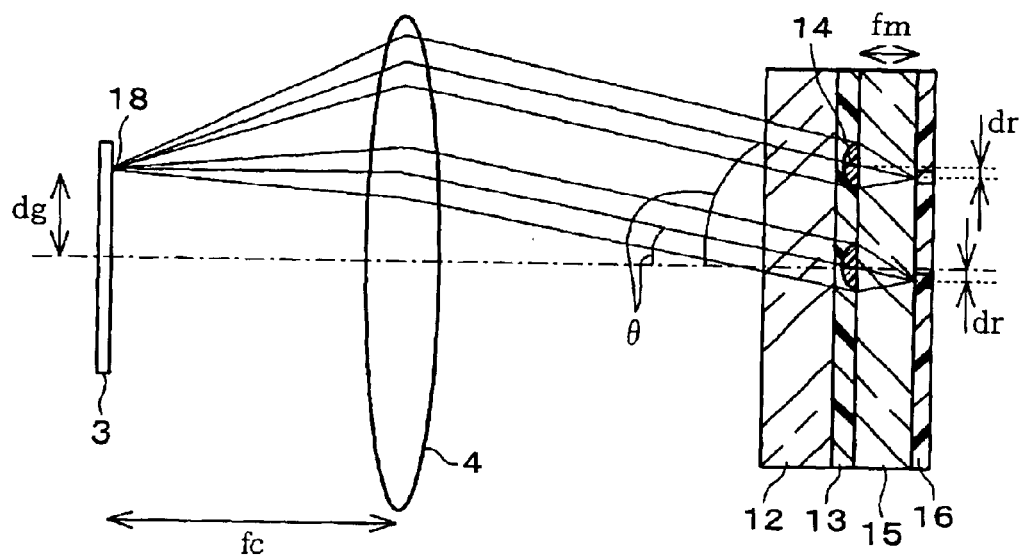
Figure 4:
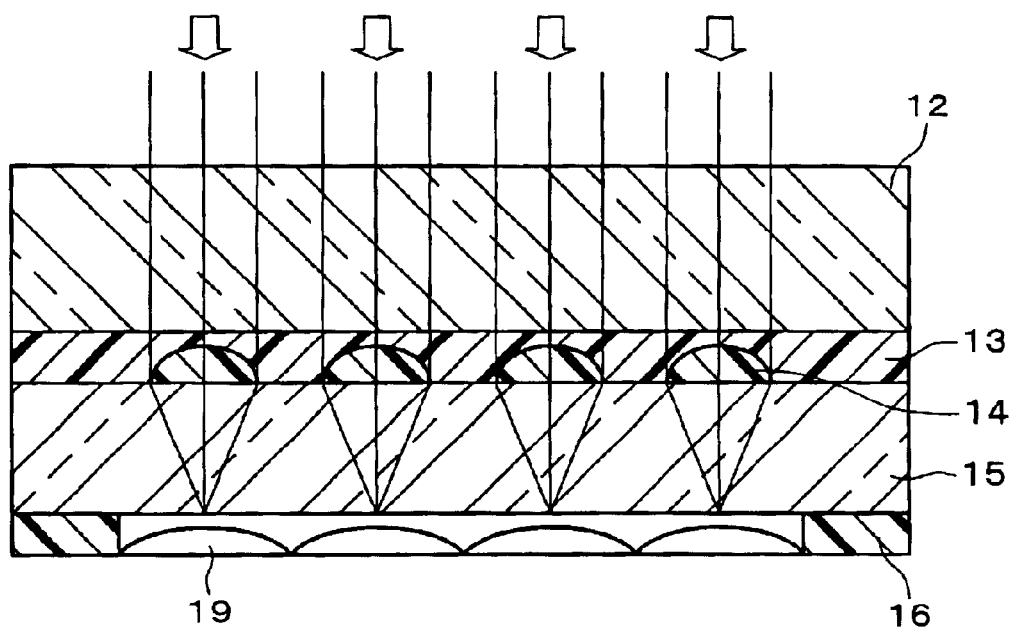
FIG. 4 is a cross-sectional view showing an arrangement of the microlens substrate in the embodiments of the present invention.

FIGS. 3(a) and 3(b) show how light is focused by an optical system including the collimator lens 4 and the first micro lens array 14. FIG. 3(a) shows focusing of light when the point light source is on the optical axis of the collimator lens 4. In this case, an on-axis point light source 17 on the transmittance distribution mask 3 is converted by the collimator lens 4 into a parallel beam, and is incident on the microlens substrate 6 at an incident angle of 0°. The light that has entered the microlens substrate 6 is condensed by the first microlens array 14 onto the negative resist 16. A condensed point is on the optical axis of the first microlens 14.

FIG. 3(b) shows focusing of light when the point light sources are off the optical axis of the collimator lens 4. In this case, an off-axis point light source 18 is converted by the collimator lens 4 into a parallel beam, as is the on-axis point light source 17, and is incident on the microlens substrate 6 at an incident angle of θ. The light that has entered the microlens substrate 6 is condensed by the first microlens array 14 onto the negative resist 16. Assuming that the distance between the optical axis and the point light source on the transmittance distribution mask 3 is dg, and the focal length of the collimator lens 4 is fc, θ is given by:

θ=tan$^{-1}$(dg/fc)     (2).

The distance dr between the condensed point on the negative resist 16 and the optical axis of the first microlens 14 is given by:

dr=fm×tan θ     (3)

where θ is the incident angle, and fm is the focal length of the first microlens array 14.

Therefore, each point light source on the transmittance distribution mask 3 is focused onto the negative resist 16 by the optical system including the collimator lens 4 and the first micro lens array 14. Moreover, because each point light source on the transmittance distribution mask 3 changes its luminance according to the transmittance of the transmittance distribution mask 3, it is possible to expose the negative resist 16 to a thickness according to the luminance of the point light source. That is, as shown in FIG. 4, it is possible to form a lens pattern 19 having a shape of a non-spherical lens, to be a pattern for forming the second microlens array.

Steps for fabricating the second microlens array are described below. FIGS. 5(a) to 5(g) show the steps for fabricating the second microlens array.

Figure 5:
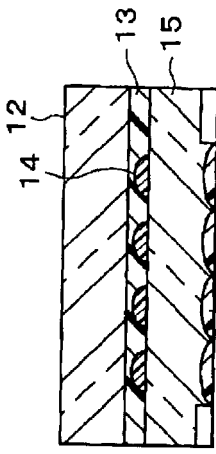
FIGS. 5(a) to 5(g) are a flow diagram showing steps for fabricating the microlens array in the embodiments of the present invention.
Figure 5:
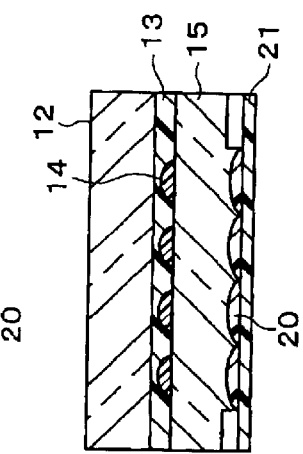
Figure 5:
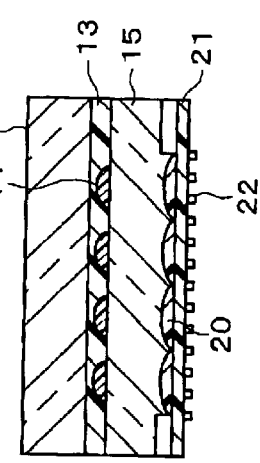
Figure 5:
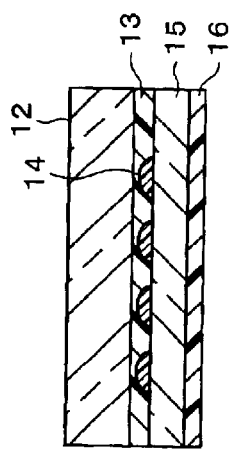
Figure 5:
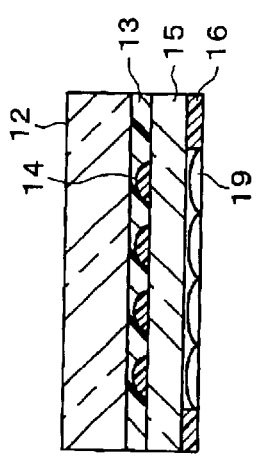
Figure 5:
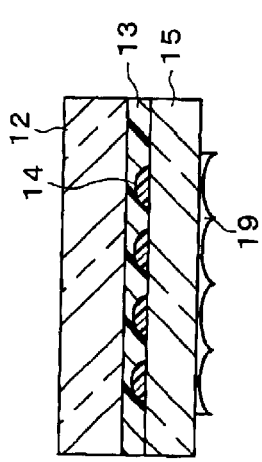
Figure 5:
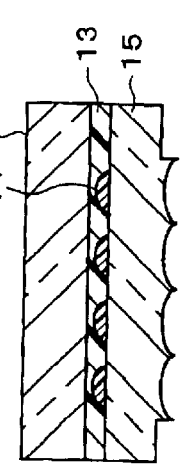

First, as shown in FIG. 5(a), the negative resist 16 is applied by spin coating on the microlens substrate 6, on which the first microlens array 14 and the second substrate 15 have been formed in advance along with other members. Then, as shown in FIG. 5(b), exposure is performed using the exposing apparatus for a microlens array according to the present invention, followed by processes including development, and, if necessary, baking, as shown in FIG. 5(c). The lens pattern 19 after development has a shape of an aspherical lens according to the transmittance of the transmittance distribution mask 3. Using the lens pattern 19 as a mask, etching is performed by a highly anisotropic method such as RIE (Reactive Ion Etching). In this way, the lens pattern 19 is copied on the silicon dioxide making up the second substrate 15, as shown in FIG. 5(d). Then, as shown in FIG. 5(e), a second microlens array 20 is formed by embedding a high refractive index resin in the lens pattern 19. Thereafter, a planarizing layer 21 is formed on the second microlens array 20 by spin coating or the like, as shown in FIG. 5(f), and a black matrix layer 22 is formed on the planarizing layer 21, as shown in FIG. 5(g).

With the above steps, the bilayered microlens array can be fabricated using the exposing apparatus for an microlens array according to the present invention.

Figure 6:
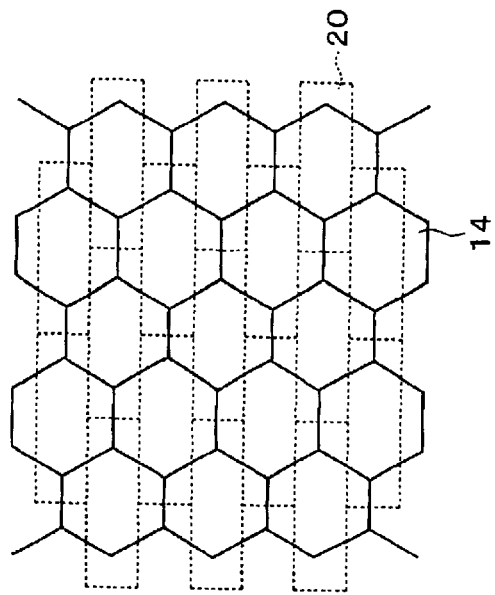
FIG. 6(a) is a plan view showing an arrangement of the first microlens array.
FIG. 6(b) is a plan view showing an arrangement of a second microlens array.
FIG. 6(c) is a plan view showing a positional relationship between the first microlens array and the second microlens array.
FIG. 6(d) is a plan view showing a positional relationship between the second microlens array and picture elements.
Figure 6:
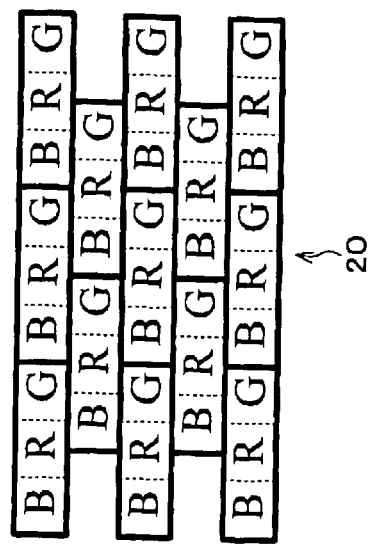
Figure 6:
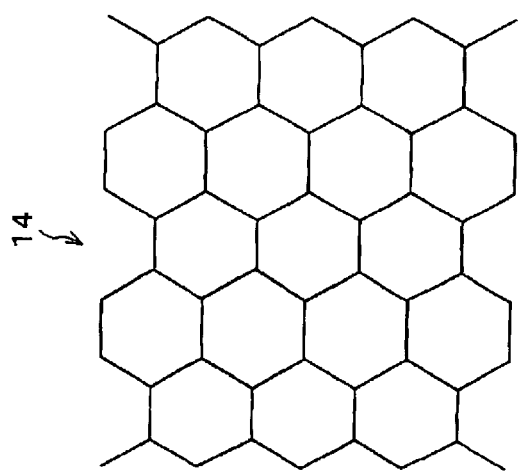
Figure 6:
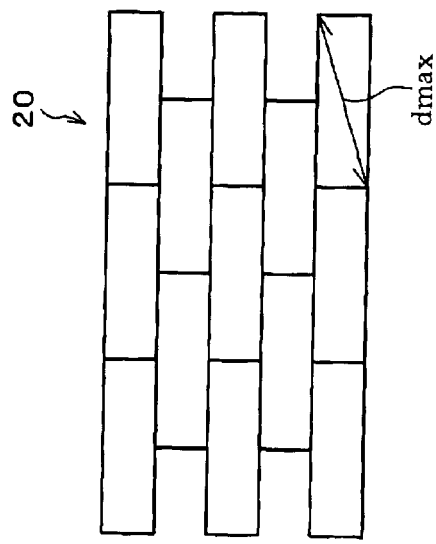

As shown in FIG. 6(a), the first microlens array 14 has a hexagonal honeycomb structure. The second microlens array 20 has a rectangular brickwork structure, as shown in FIG. 6(b). A positional relationship between the first microlens array 14 and the second microlens array 20 is shown in FIG. 6(c). A positional relationship between the second microlens array 20 and picture elements is shown in FIG. 6(d).

The maximum incident angle of the parallel light beams emitted from the collimator lens 4 into the microlens substrate 6 is given by:

$$\text{maximum incident angle} = \tan^{-1}(d_{max}/f_m) \quad (4)$$

where dmax is the length of a diagonal line in a lens of the second microlens array 20 shown in FIG. 6(b), and fm is the focal length of the first microlens array 14 (see FIG. 3(b)).

The following describes how easy it is to align the micro fly-eye lens 2 and the transmittance distribution mask 3 in the exposing apparatus for a microlens array of the present embodiment.

Figure 7:
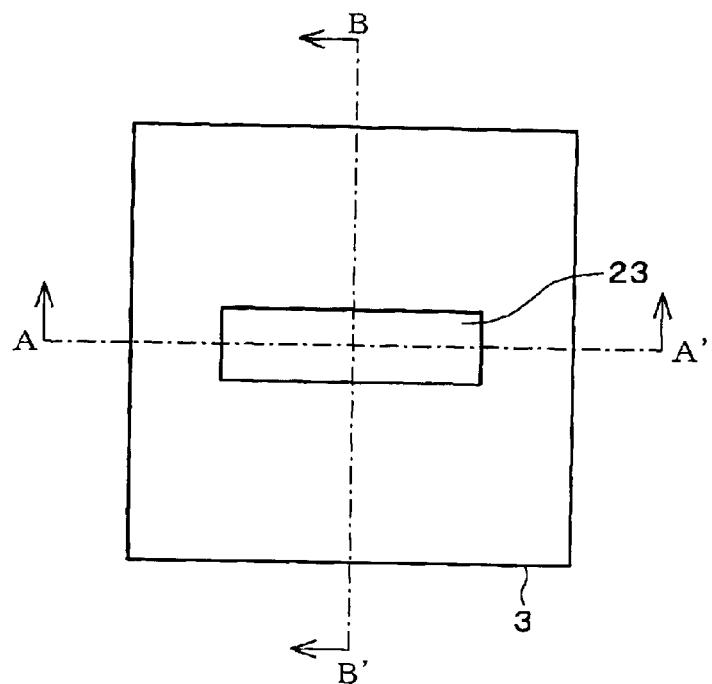
FIG. 7(a) is a plan view showing a pattern formed on a transmittance distribution mask that corresponds to a shape of the second microlens.
FIGS. 7(b) and 7(c) show a transmittance distribution in a cross-section of the pattern.
Figure 7:
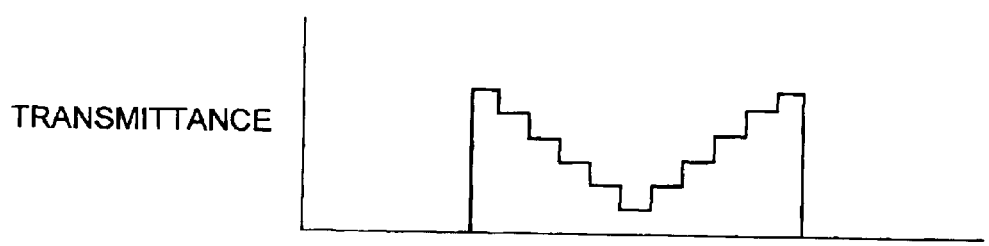
Figure 7:
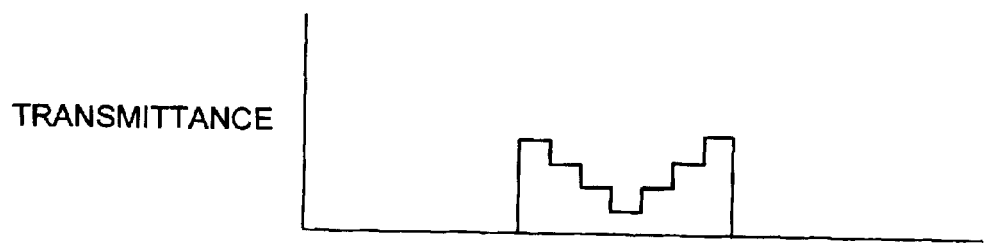

As shown in FIG. 7(a), the transmittance distribution mask 3 has a pattern 23 that corresponds to the shape of the second microlens array. The transmittance distribution of the pattern 23 in a cross-section taken along line A—A' is shown in FIG. 7(b). The transmittance distribution of the pattern 23 in a cross-section taken along line B—B' is shown in FIG. 7(c). In either case, the transmittance distribution is in the form of steps. In portions other than the pattern 23, the transmittance distribution is set to either zero, or, in view of the photosensitive properties of the negative resist 16, to a value that has no influence.

The transmittance distribution mask 3 has regions C24, D25, E26, and F27, each having its own transmittance (in other words, the transmittance is distinct for each region). The regions C24, D25, E26, and F27 are related to the pitch of the micro fly-eye lens 2 in the manner described below.

Figure 8:
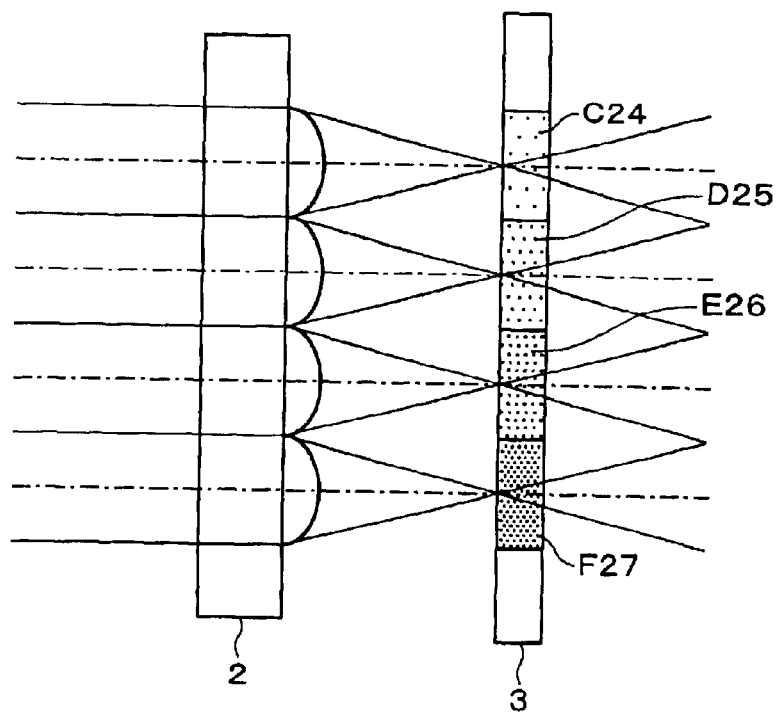
FIGS. 8(a) and 8(b) are side views showing arrangements of the transmittance distribution mask and a micro fly-eye lens.
Figure 8:
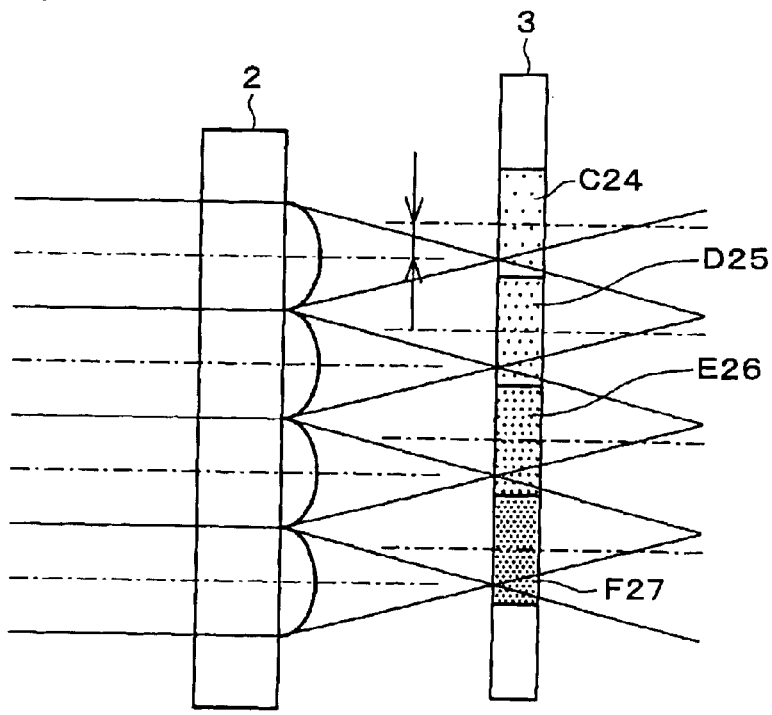

As shown in FIG. 8(a), the pitch of varying transmittance in an in-plane direction of the transmittance distribution mask 3 is equal to the pitch of the secondary point light sources, i.e., the pitch of the micro fly-eye lens. The incident parallel beam on each micro fly-eye lens 2 condenses on the focal point of the micro fly-eye lens 2, and the light passes through the transmittance distribution mask 3 that is disposed on the focal point.

With this arrangement, as shown in FIG. 8(b) for example, even if misalignment occurs between the optical axis of lens of the micro fly-eye lens 2 and the center of the region of the transmittance distribution mask 3 having a distinct transmittance, the luminance of the light beam from the micro fly-eye lens 2 remains the same as long as the amount of misalignment is equal to or less than the pitch of the micro fly-eye lens 2. Therefore, the exposed shape of the negative resist 16 will not be changed.

In a case where the regions E26 and E27 have the same transmittance, the pitch of varying transmittance in the in-plane direction of the transmittance distribution mask 3 should be an integer multiple of the pitch of the secondary point light sources, i.e., the pitch of the micro fly-eye lens 2.

In the exposing apparatus for a microlens array of the present embodiment, the pitch p of the micro fly-eye lens 2, i.e., the pitch of the regions in the transmittance distribution mask 3 respectively having distinct transmittances, is given by:

$$P = S/m = S \times f_c/f_m \quad (5)$$

where fc is the focal length of the collimator lens 4, fm is the focal length of the first, microlens array 14, m is the optical magnification that depends on fc and fm, and S is the resolution of an image forming the second microlens array 20.

In the present embodiment, S=0.5 μm, and m=0.001. Therefore, p=500 μm. If p is equal to or less than 500 μm, the shape of the second microlens array 20 is not affected. The resolution S depends on the resolution of the negative resist 16 and the resolution of the first microlens array 14.

Therefore, as shown in FIGS. 8(a) and 8(b), the acceptable range of misalignment between the micro fly-eye lens 2 and the transmittance distribution mask 3 is ±250 μm, which makes it easier to align the micro fly-eye lens 2 and the -transmittance distribution mask 3.

Incidentally, there is a case where the beam spot focused by the micro fly-eye lens 2 increases in diameter due to uneven parallel beams from the parallel light source. Even in such a case, uniform transmittance is ensured over the entire area of the increased diameter, making it possible to provide uniform illuminance for the microlens substrate 6.

Because the parallel beam passes through the transmittance distribution mask 3 over a small area, the transmittance distribution mask 3 with varying transmittances does not cause any adverse effect. This, combined with the fact that the illuminance distribution of the light illuminating the microlens film 6 can be confined in a small range, enables the microlens substrate 6 to be exposed only with small non-uniformity.

The following specifically describes a relationship between the micro fly-eye lens 2 and the illuminance distribution of the exposure light illuminating the microlens substrate 6.

Figure 9:
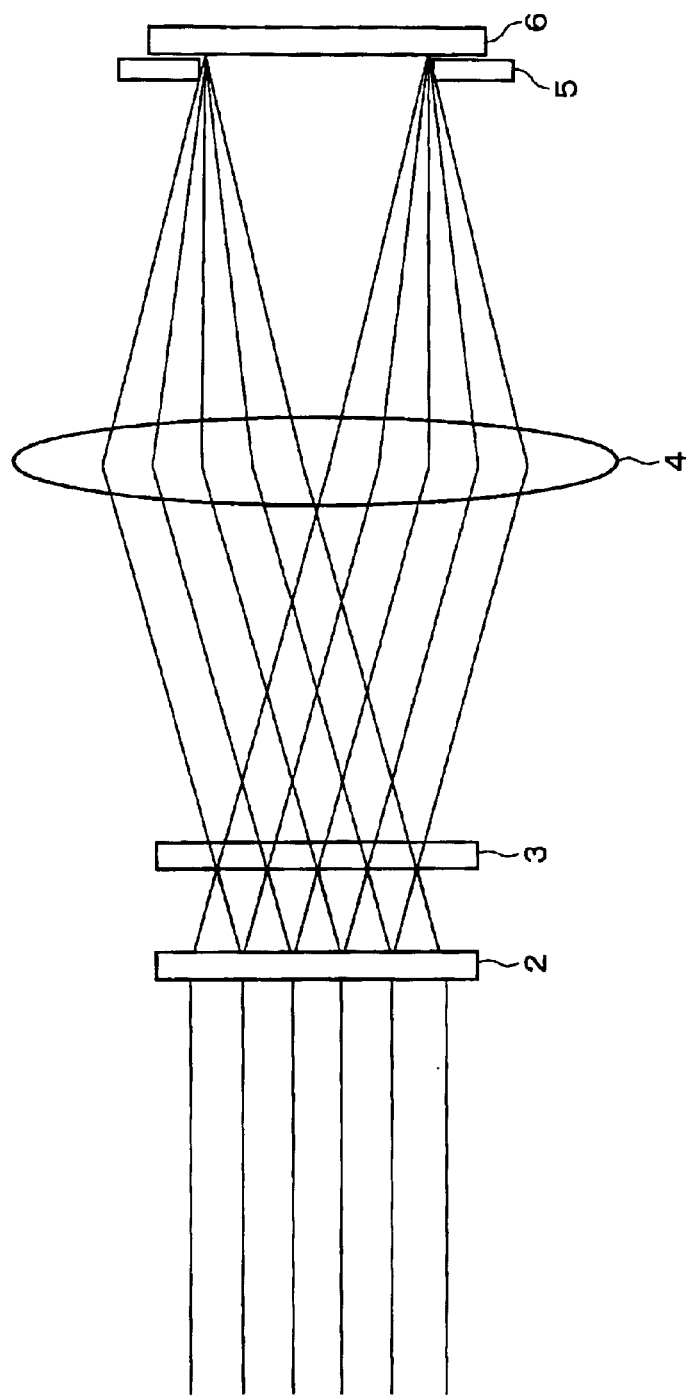
FIG. 9 is a side view showing how the microlens substrate is exposed in the embodiments of the present invention.

As shown in FIG. 9, the parallel beam is converted by each lens of the micro fly-eye lens 2 into the secondary point light source. Then, the luminance of the secondary point light source is modulated by the transmittance distribution mask 3. After that, the secondary point light source acts upon the collimator lens 4 as an object point having a particular height from the optical axis, and enters the collimator lens 4 with an angle of incidence in accordance with the height of the object point. The light of each secondary point light source that has passed through the collimator lens 4 is incident on the microlens substrate 6 as a parallel beam having an angle corresponding to the field angle of the collimator lens 4. Here, the illuminance distribution of each parallel beam incident on the microlens substrate 6 with a particular incident angle depends on the illuminance distribution of the corresponding parallel beam incident on the lens of the micro fly-eye lens 2. Therefore, the shorter the pitch of the micro fly-eye lens 2 is (the smaller the diameter of the lenses is), the more advantageous it is for attaining uniform illuminances.

As long as the incident light on each lens of the micro fly-eye lens 2 is uniform in illuminance, it is not absolutely necessary that the effective region (region for the pattern 23 of the transmittance distribution mask 3) of the micro fly-eye lens 2 has a uniform illuminance. Further, non-uniform illuminances of the light beams respectively incident on the lenses of the micro fly-eye lens 2 (differences between the lenses) can be corrected by adjusting the transmittances of the transmittance distribution mask 3. Therefore, it is not necessary that the illuminance of the light beam of the parallel light source is uniform over the entire area of the light beam. That is, it is not necessary that the illuminance of the light source is even throughout the effective region. Instead, the illuminance needs to be uniform within each lens of the micro fly-eye lens 2. Therefore, the light source can be designed more flexibly.

Here, the micro fly-eye lens 2 is a collection of lenses disposed in an array. The effective region of the micro fly-eye lens 2 is a region in which the lenses are provided. In the present embodiment, it is necessary that the light emitted from the light source unit 1 illuminates the whole masking region (pattern 23) of the transmittance distribution mask 3. The effective region is such a region that allows the light to illuminate the whole masking region of the transmittance distribution mask 3.

In the present embodiment, the effective NA (Numerical Aperture) of the collimator lens 4 is smaller than the NA of the micro fly-eye lens 2. This is to ensure that the incident light beam on the collimator lens 4 is larger than the light beam that illuminates the microlens substrate 6.

Figure 10:
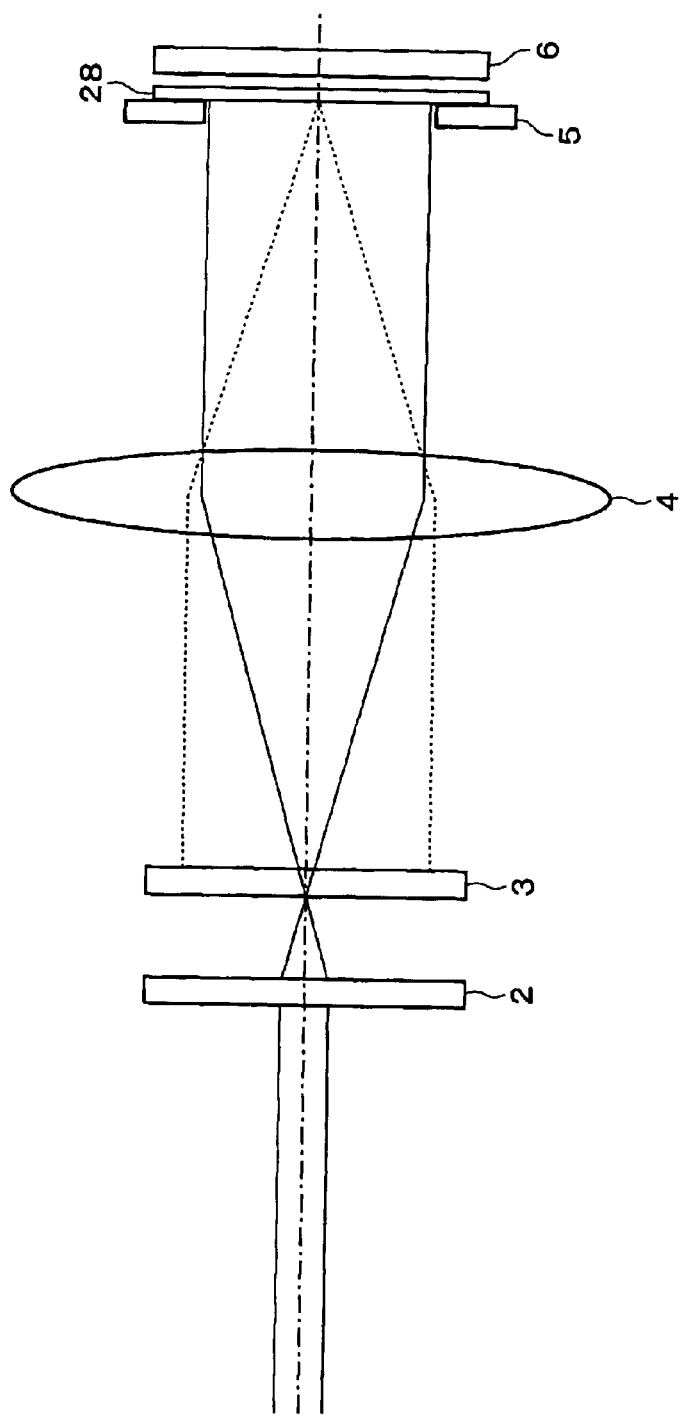
FIG. 10 is a side view showing how the microlens substrate is exposed in the embodiments of the present invention.

Moreover, as shown in FIG. 10, a position of the collimator lens 4 in an optical axis direction is so determined that the secondary point light source emitted from the center of the transmittance distribution mask 3 is converted into a parallel beam on its way through the collimator lens 4 and leaves the collimator lens 4 parallel to the optical axis. The microlens substrate 6 is disposed on the posterior focal point of the collimator lens 4 so that the microlens substrate 6 is perpendicular to the optical axis of the collimator lens 4, and that the optical axis of the collimator lens 4 lies on the center of the microlens substrate 6. Similarly, the microlens substrate aperture 5 is so disposed that the center thereof is on the optical axis of the collimator lens 4, and that the microlens substrate aperture 5 is perpendicular to the optical axis of the collimator lens 4.

With this arrangement, all the light beams that are parallel to the optical axis and that respectively pass through centers of the lenses of the micro fly-eye lens 2 are incident on the center of the microlens substrate aperture 5, i.e., the center of the micro lens substrate 6.

Even if the light emitted from the respective lenses of the micro fly-eye lens 2 and converted into parallel beams by the collimator lens 4 has non-uniform illuminance distributions, uniformity of illuminance distributions for the microlens substrate 6 can be obtained by providing, for example, an illuminance uniforming filter 28 in the vicinity of the microlens substrate aperture 5. This is because (i) the light beams respectively emitted from the lenses of the micro fly-eye lens evenly overlap on an exposed portion of the microlens substrate 6 to provide a gradual illuminance distribution and (ii) the light beams respectively emitted from the lenses of the micro fly-eye lens are axially symmetrical with respect to the central axis of the microlens substrate aperture 5.

The illuminance uniforming film 28 is, for example, a transmittance distribution filter having an axially symmetrical transmittance distribution, with a low transmittance in a central portion and a high transmittance in a peripheral portion.

The diameter of the collimator lens 4 depends on the diameter of the light beam that illuminates the microlens substrate 6, and the maximum incident angle of the light incident on the first microlens array 14.

Figure 11:
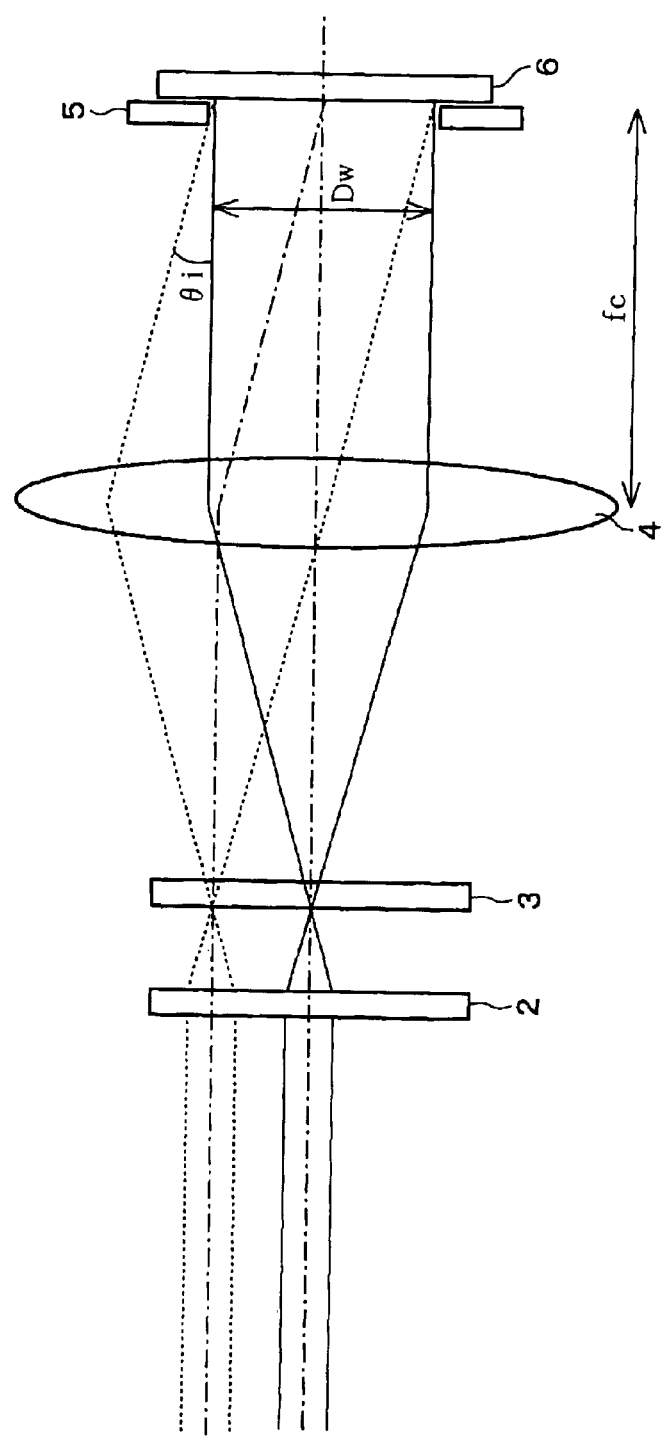
FIG. 11 is a side view showing how the microlens substrate is exposed in the embodiments of the present invention.

As shown in FIG. 11, the diameter Dw of the light beam that illuminates the microlens substrate 6 defines an area that can be exposed at once. The diameter Dw depends on the chip size or the size of the microlens substrate 6. In the present embodiment, Dw=35 mm.

The maximum angle θi of the light beam incident on the microlens substrate 6 is given by:

$$dmax = fm \times \tan \theta i \quad (6)$$

where fm is the focal length of the first microlens array 14 (see FIG. 3(b)), and dmax is the length of the diagonal line in each lens of the second microlens array 20.

In the present embodiment, dmax=23.72 μm, and fm=70 μm. Therefore, θi=18.7°.

Accordingly, the effective diameter Dc of the collimator lens 4 is given by:

$$Dc = 2 \times fc \times \tan \theta i + Dw \quad (7).$$

In other words, $$Dc = 2 \times fc \times NAc + 2 \times fc \times \tan \theta i \quad (8).$$

Therefore, Dc=102.7 mm.

As described above, an exposing apparatus for a microlens array of the present invention includes: a secondary point light source generating section for converting a light beam from a light source into secondary point light sources; a luminance adjustment section for receiving light of each secondary point light source and adjusting luminance of the light; and a parallel light beam generating section for converting the light with adjusted luminance into a parallel light beam, and guiding the parallel light beam, via a first microlens array which is formed in advance, to a photosensitive resin layer to be a second microlens array.

In this invention, the light beam emitted by the light source is incident on the secondary light source generating section, and is converted into secondary light sources. The light beams of the respective secondary light sources are incident on the luminance adjustment section, and the luminances of the respective light beams are adjusted therein. With this arrangement, the point light sources function as point light sources respectively having variable luminances. Therefore, it is possible to desirably adjust the luminances of the respective light beams projected on the photosensitive resin layer.

The light beams with adjusted luminances are incident on the parallel light beam generating section, and are converted into parallel light beams. The light beams so converted into parallel light beams are then incident on the first microlens array which is formed in advance, and are refracted, condensed, and guided by the first microlens array to the photosensitive resin layer. In this way, the photosensitive resin layer is exposed with high accuracy. By thus exposing the photosensitive resin layer, the second microlens array is formed.

The incident angle of the light beam guided from the parallel light beam generating section to the second microlens array depends on the position of the secondary light source emitted by the secondary light source generating section. The illuminance of the parallel light beam on the second microlens array (illuminance of the parallel light beam on the photosensitive resin layer) can be varied by the adjustment by the luminance adjustment section.

With this arrangement, the second microlens array can be fabricated with high accuracy, without requiring a conventional complex alignment step, in which the first microlens and the second microlens are aligned in an in-plane direction by moving a stamper mold up and down using a bearing in performing molding. This drastically improves the light efficiency of the microlens array. Moreover, the color mixture that occurs when a light beam enters an adjacent pixel can be prevented. As a result, image quality is drastically improved.

Moreover, designing of the microlens array is no longer restricted by the alignment step, because the illuminance on the photosensitive resin layer is adjusted by adjusting luminances, in the luminance adjustment section. Therefore, freedom of design, which is necessary to optimize light efficiency, can be drastically improved. In addition, the refractive indices on the respective lens surfaces can differ by a sufficient margin. As a result, it is possible to fabricate lenses having a short focal length. Furthermore, the formation of the vertical wall is no longer required, because the conventional mold-processing is no longer required. As a result, it is possible to successfully overcome the conventional problem that the lens section is damaged when detached from the mold.

In the present embodiment, such a light source that emits a parallel light beam is used as an example. This is because the parallel light beam can more easily converted into secondary point light sources over a larger area by the secondary light source generating section, such as the micro fly-eye lens. However, provided that the light can be converted into secondary point light sources over a relatively smaller area, the light source is not limited to emit a parallel light beam and the same effect can be attained with convergent light, divergent light, or the like.

[Second Embodiment]

With reference to FIG. 1(b), a second embodiment of the present invention is described below. For the purpose of explanation, members whose functions are the same as those of the members described in the First Embodiment are labeled with the same referential numerals, and explanations thereof are omitted. The following mainly describes differences between the First Embodiment and the present embodiment.

As shown in FIG. 1(b), an exposing apparatus for a microlens array includes a light source unit 1, a micro fly-eye lens 2, a magnification conversion optical system (magnification conversion section) 29, a transmittance distribution mask 3, a collimator lens 4, and a microlens substrate aperture 5. A microlens substrate 6, which is to be exposed by the exposing apparatus for a microlens array, is provided in proximity with the microlens substrate aperture 5.

In short, the exposing apparatus for a microlens array of the present embodiment additionally includes the magnification conversion optical system 29 in the exposing apparatus for a microlens array of the First Embodiment.

The magnification conversion optical system 29 is disposed between the micro fly-eye lens 2 and the transmittance distribution mask 3. The magnification conversion optical system 29 includes a convex lens (first lens group) 30a, a convex lens (second lens group) 30b, and an aperture (aperture member for the magnification conversion section) 31. The magnification conversion optical system 29 expands the secondary light sources that have passed through the micro fly-eye lens 2, so as to convert the secondary light sources into tertiary light sources.

The transmittance distribution mask 3 is disposed on a position where the tertiary light sources formed by the magnification conversion optical system 29 are located. The collimator lens 4 converts the tertiary light sources that have passed through the transmittance distribution mask 3 into parallel beams. The tertiary light sources that have been converted by the collimator lens 4 into parallel beams are transmitted through the microlens substrate aperture 5, and are incident on -the microlens substrate 6.

The following describes a mechanism by which the exposing apparatus for a microlens array according to the present invention with the above arrangement exposes the microlens substrate 6.

As in the First Embodiment, an integrator 9 provides a uniform illuminance distribution for the light emitted by a high-pressure mercury lamp 8 and for the light condensed by an elliptic mirror 7. The light of uniform transmittance distrubution is then converted by a condensing lens 10 into a parallel beam. A wavelength-selective filter 11 passes only the i ray of the parallel beam. The light source unit 1 thus emits a parallel beam.

The parallel beam emitted by the light source unit 1 are converted by the micro fly-eye lens 2 into secondary light sources, and forms point light sources, the number of which is equal to the number of lenses of the micro fly-eye lens 2, on the focal points of the micro fly-eye lens 2. The point light sources are expanded by the magnification conversion optical system 29, so that the point light sources become the tertiary light sources. The magnification conversion optical system 29 expands the light with a lateral magnification that depends on the respective focal lengths f of the convex lenses 30a and 30b. In the present embodiment, the focal length f of the convex lens 30a is 10 mm, and the focal length f of the convex lens 30b is 50 mm. The aperture 31 is disposed at a position 10 mm (focal length of the convex lens 30a) away from the convex lens 30a. The point light sources are expanded five times with this lateral magnification. Among the light beams incident on the magnification conversion optical system 29, those light beams that are parallel to the optical axis leave the magnification conversion optical element 29 as parallel beams parallel to the optical axis. In short, the magnification conversion optical system 29 is a so-called telecentric optical system.

The transmittance distribution mask 3 is disposed at a position where the tertiary light sources formed by the magnification conversion optical system 29 are located. The transmittance distribution of the transmittance distribution mask 3 is determined in accordance with the luminance of the light source unit 1, the illuminance distribution on the transmittance distribution mask 3, and the photosensitive properties of a negative resist 16, which is the target of exposure.

Because the transmittance distribution mask 3 is disposed at a position where the tertiary light sources are located, the tertiary light sources pass through the transmittance distribution mask 3 as small beam spots, i.e., as tertiary point light sources. At this time, the light intensity of each tertiary point light source is modulated in accordance with the transmittance distribution of the transmittance distribution mask 3, and the tertiary light source functions as a tertiary point light source with a predetermined luminance. After converted by the collimator lens 4 into a parallel beam, the tertiary point light source is transmitted through the microlens substrate aperture 5, and is incident on the microlens substrate 6.

In the exposing apparatus for a microlens array of the present embodiment, as in the First Embodiment, the tertiary light source on the optical axis of the collimator lens 4 is incident on the microlens substrate 6 as a parallel light beam parallel to the optical axis. The tertiary point light source that is off the optical axis of the collimator lens 4 is incident on the microlens substrate 6 as a parallel light beam having a certain angle with respect to the optical axis. The certain angle is denoted by $\beta$ that satisfies the following equation:

(The distance between the optical axis and the tertiary point light source off the optical axes)=(the focal length of the collimator lens 4)×tan $\beta$     (9).

Therefore, the angle created by the parallel light beam with respect to the optical axis of the collimator lens 4, i.e., the angle of incidence on the microlens substrate 6 depends on the position of the tertiary point light source. The illuminance of the parallel light beam on the microlens substrate 6 can be varied by adjusting the luminance of the secondary point light source, i.e., by adjusting the transmittance of the transmittance distribution mask 3.

As in the First Embodiment, the microlens substrate aperture 5 may be adapted to have a rectangular opening having a size of, for example, one chip of a liquid crystal panel, so that one chip can be exposed by a single ir radiation of exposure light. In this case, in an arrangement where a plurality of chips are mounted on one wafer, it is possible to expose the plurality of chips by a step-and-repeat method. With this arrangement, a precision microlens array can be fabricated at high speed, even if uniformity cannot be ensured for the irradiated exposure light over a large area of the microlens substrate 6.

With the exposing apparatus for a microlens array of the present embodiment, it is also possible to fabricate a bilayered microlens array using the method of exposing the microlens array 6 described in the First Embodiment.

In the exposing apparatus for a microlens array of the present embodiment, the magnification conversion optical system 29 converts magnification between the micro fly-eye lens 2 and the transmittance distribution mask 3. Therefore, the present embodiment needs to take into consideration this difference from the First Embodiment in fabricating the bilayered microlens array.

Moreover, in the exposing apparatus for a microlens array of the present embodiment, the pitch p of the micro fly-eye lens 2 should be smaller than a pitch p given by:

$$p=S/m=S\times fc/(fm\times mb)$$     (10)

where m is the optical magnification that is determined by the focal length fc of the collimator lens 4 (see FIG. 3(b)) and by the focal length fm (see FIG. 3(b)) of the first microlens array 14 (see FIG. 3(b)), S is the resolution of an image that forms a second microlens array 20, and mb is the magnification of the magnification conversion optical system 29.

The transmittance distribution mask 3 has a transmittance distribution in the form of steps, as described above. It is preferable that a recurring cycle of regions in the transmittance distribution mask 3, each having a distinct transmittance, is equal to the pitch of the lenses of the micro fly-eye lens 2 multiplied by the magnification of the magnification conversion optical system 29.

Considering the properties of the collimator lens 4 on and off the optical axis, the longer the focal length of the collimator lens 4 is, the easier it is to fabricate the collimator lens 4. Accordingly, the transmittance distribution mask 3 is relatively large. It is therefore necessary that the micro fly-eye lens is also large. However, because the micro fly-eye lens 2 is made up of very small and precision lenses disposed two dimensionally (disposed on a plane), not only high accuracy but also low cost is difficult to achieve for micro fly-eye lens 2 having a large area.

In the exposing apparatus for a microlens array having the magnification conversion optical system 29 described in the present embodiment, the magnification conversion optical system 29 is provided for adjusting magnification between the micro fly-eye lens 2 and the transmittance distribution mask 3. The provision of the magnification conversion optical system 29 makes it possible to realize an exposing apparatus for a precision microlens array with micro fly-eye lens 2 of a small external size, even when the transmittance distribution mask 3 is large.

In the present embodiment, m=0.001. Therefore, the transmittance distribution mask 3 needs to be 50×50 mm. Similarly, the micro fly-eye lens 2 needs to be 50×50 mm. However, because the exposing apparatus for a microlens array of the present embodiment includes the magnification conversion optical system 29, which is capable of magnifying light five times, it is sufficient that the micro fly-eye lens 2 is 10×10 mm.

Moreover, if the micro fly-eye lens 2 and the transmittance distribution mask 3 only need to be related to each other by a lateral magnification of 1:1, the magnification conversion optical system 29 is not required. This is essentially the same as the exposing apparatus for a microlens array described in the First Embodiment.

As described above, in the exposing apparatus for a microlens array of the present invention, the light transmitted through the micro fly-eye lens 2 is expanded by the magnification conversion optical system 29, and the luminance of the light is adjusted by the transmittance distribution mask 3. Therefore, it is preferable that the micro fly-eye lens 2 and the transmittance distribution mask 3 operate in conjunction with each other with respect to the magnification conversion optical system 29.

As described above, with the exposing apparatus for a microlens array of the present invention, the bilayered microlens array can be easily fabricated with high accuracy and without complex alignment steps. In other words, with the exposing apparatus for a microlens array of the present invention, the bilayered microlens array can be exposed both accurately and easily. Moreover, in the exposing apparatus for a microlens array of the present invention, the optical system can be aligned easily. Therefore, it is possible to realize a precision exposing apparatus for a microlens array.

According to the present invention, the light efficiency is approximately twice as high as that of the conventional arrangement, given that the liquid crystal substrates have the same size, for example. In addition, the first microlens array 14 and the second microlens array 20 can be accurately aligned with an error of 1 $\mu$m or less. Therefore, it is possible to manufacture a liquid crystal projection apparatus that is free from uneven display and that has excellent color reproducibility.

In one aspect of the invention, the exposing apparatus for a microlens array is an exposing apparatus for a bilayered microlens array having a plurality of lenses on a substrate, the exposing apparatus including a first microlens having a condensing function, and the exposing apparatus causing the light that passes through the first microlens to have such an intensity distribution as to shape a photosensitive resin to be a second microlens array, the exposing apparatus including: an emitter for emitting a light beam of a substantially uniform radiant intensity; a secondary point light source generating section for converting the light beam of a substantially uniform radiant intensity into secondary point light sources; a luminance adjustment section for adjusting the luminance of the light of the secondary point light source so that the luminance matches a desired shape of the microlens array to be formed; and a parallel light beam generating section for processing the light of the secondary point light source into a parallel light beam, the luminance adjustment section being disposed behind the secondary point light source generating section with respect to a traveling direction of the light beam radiated from the emitter.

In one aspect of the invention, the exposing method for a microlens array is an exposing method for exposing a photosensitive resin applied on a substrate, so as to obtain a desired shape for the microlens array, the exposing method including the steps of: processing a light beam of a substantially uniform radiant intensity into a secondary point light source; adjusting the luminance of the light of the secondary point light source, so that the luminance matches a desired shape of the microlens array to be formed; and converting the light of the secondary point light source into a parallel light beam, the parallel light beam passing through the microlens array to expose the photosensitive resin, so as to obtain a desired shape for the microlens array.

Although the photosensitive resin in the First Embodiment and the Second Embodiment is the negative resist, the present invention is not limited to this arrangement. The photosensitive resin may be a positive resist, an ultraviolet curable resin, or the like.

It is preferable that the secondary point light source generating section is a plurality of two-dimensionally disposed optical elements (e.g. hexagonal honeycomb structure or rectangular brickwork structure) for condensing the light beam emitted from the emitter. It is preferable that the secondary point light source generating section is a fly-eye lens. It is preferable that the luminance adjustment section is a transmittance distribution mask having a transmittance distribution for a predetermined wavelength of light.

It is preferable that the transmittance distribution mask is disposed in the vicinity of a posterior focal point of the fly-eye lens. In this case, the beam spots that focus on the transmittance distribution mask are transmitted through the transmittance distribution mask. The beam spots are thereby accurately modulated in light intensity. Therefore, it is possible to successfully convert the beam spots into point light sources respectively having luminances.

It is preferable that the transmittance distribution of the transmittance distribution mask is in the form of steps. With the mask of a stepped transmittance distribution, the luminances of the respective secondary point light sources can be adjusted in a simple manner. In a mask having a continuous transmittance distribution, misalignment of the mask causes the luminances of the point light sources to be non-uniform in accordance with the gradient of the transmittance distribution. In contrast, with the mask having a stepped transmittance distribution, misalignment is tolerated to the extent that depends on the recurrent cycle of the transmittances and the interval between adjacent ones of the point light sources. Furthermore, uniform illuminance and uniform exposure can be obtained even when the secondary point light sources are large due to aberration of the fly-eye lens, or uneven parallel light beams, or the like. This is because the transmittance distribution mask has the same transmittance over the entire beam spot of each secondary point light source, and accordingly has the same transmittance for the light beam of the secondary point light source.

It is preferable that the transmittance distribution of the transmittance distribution mask has transmittances of at least three levels. Moreover, it is preferable that the transmittance distribution is such that the transmittance distribution mask has a plurality of regions respectively having distinct transmittances at a predetermined pitch in an in-plane direction of the transmittance distribution mask, and that the pitch is equal to an integer multiple of a distance between adjacent ones of the secondary point light sources.

In this case, the parallel light beams incident on the lenses of the fly-eye lens are condensed onto the respective focal points of the lenses of the fly-eye lens. Therefore, the incident parallel light beams pass through the transmittance distribution mask that is provided on the focal points. With this arrangement, even if misalignment occurs between the center of the lens of the fly-eye lens and the center of the region, of the transmittance distribution mask 3, having a distinct transmittance, the luminance of the light beam from the lens of the fly-eye lens does not change as long as the amount of misalignment is equal to or less than the pitch of the micro fly-eye lens. Therefore, the exposed shape of the negative resist is not affected by the misalignment. This drastically improves quality of exposure.

It is preferable that the parallel light beam generating section is a collimator lens. It is preferable that the pitch p of each lens of the fly-eye lens satisfies $p < S \cdot fc/fm$, where S is the resolving power on the photosensitive resin layer that depends on the resolution of the photosensitive resin layer and the resolving power of the first microlens array, fc is the focal length of the collimator lens, and fm is the focal length of the first microlens array.

For example, if $S=0.5$ $\mu m$ and $fc/fm=1000$, the pitch $p=500$ $\mu m$. As long as the pitch p is less than 500 $\mu m$, the shapes of the second microlens array are not affected. Therefore, the misalignment between the transmittance distribution mask and the fly-eye lens is tolerated up to ±250 $\mu m$. This makes it very easy to perform alignment.

It is preferable that parallel light beam from the collimator lens is incident on the first microlens array via an aperture member, and satisfies $NAc < NAf$ when NAc is the effective numerical aperture of the collimator lens including the aperture member and NAf is the numerical aperture of the fly-eye lens.

It is preferable that the aperture member is disposed in the vicinity of the photosensitive resin layer on the side of the light source. For example, a microlens array for plural chips is disposed on a substrate of a round or square shape, and is processed per wafer. In case of a large substrate (wafer), however, a radiation area of the collimator lens is not large enough to process (expose) the whole substrate at once. Therefore, it is necessary to shut off the light beams incident on the substrate, and to perform step-and-repeat exposure per several chips. In this exposure, it is optimal that the light beams are shut off on the substrate, because such an optical arrangement is adopted that the incident light beams on the substrate at different incident angles are overlapped on the substrate. The light beams can be shut off on the substrate by disposing the aperture member in the vicinity of the photosensitive resin layer on the side of the light source.

It is preferable that an effective diameter Dc of the collimator lens is given by $Dc = 2 \cdot fc \cdot NAc + 2 \cdot fc \cdot \tan \theta i$, where fc is the focal length of the collimator lens, NAc is the effective numerical aperture of the collimator lens, and Oi is the maximum incident angle of the parallel light beams incident on the first microlens array from the collimator lens.

It is preferable that the photosensitive resin layer is disposed at the posterior focal point of the collimator lens. In this case, it is possible to efficiently and certainly expose the photosensitive layer so as to form the second microlens array, because the parallel light beams from the collimator lens are focused on the photosensitive resin layer.

It is preferable that the center of the aperture member and the center of the photosensitive resin layer lie on an optical axis of the collimator lens, and that the exposing apparatus for a microlens array further includes: an illuminance adjustment section between the aperture member and the first microlens array. In this case, all the light beams emitted from the collimator lens are projected via the aperture member onto the photosensitive resin layer. Even if the light beams emitted from the aperture member has an illuminance distribution, the illuminance adjustment section can provide uniform illuminance.

It is preferable that the illuminance adjustment section has a transmittance distribution that is symmetrical with respect to the optical axis; and the illuminance adjustment section is a filter for providing uniform illuminance for the received light. In this case, it is further preferable that the transmittance distribution of the filter is such that the transmittance of the filter increases from a central portion of the filter toward a peripheral portion of the filter.

It is preferable that the exposing apparatus for a microlens array further includes: a magnification conversion section between the secondary point light source generating section and the luminance adjustment section. By providing the magnification conversion section, it is possible to realize, using a small fly-eye lens, a precision exposure optical system, even if the transmittance distribution mask is large.

It is preferable that the magnification conversion section includes a first lens group and a second lens group which respectively have positive refracting powers, and a distance between a principal point of the first lens group and a principal point of the second lens group is equal to a sum of the focal length of the first lens group and the focal length of the second lens group, and that the exposing apparatus further includes: an aperture member, at a posterior focal point of the first lens group, for the magnification conversion section.

It is preferable that the transmittance distribution of the transmittance distribution mask is in the form of steps. With this arrangement, the luminances of the tertiary point light sources can be adjusted in a simple manner. In a mask having a continuous transmittance distribution, misalignment of the mask causes the luminances of the point light sources to be non-uniform in accordance with the gradient of the transmittance distribution. In contrast, with the mask having a transmittance distribution in the form of steps, misalignment is tolerated to a certain extent that depends on the recurrent cycle of the transmittance and the interval between adjacent ones of the point light sources. Furthermore, uniform exposure uniform illuminance can be attained even if the tertiary point light sources are large due to aberration of the fly-eye lens, or uneven parallel light beams, or the like. This is because the tertiary point light sources have the same transmittance over the entire beam spot of each tertiary point light source, and accordingly has the same transmittance for the light beam of the tertiary point light source.

It is preferable that the secondary point light source generating section is a fly-eye lens; the luminance adjustment section is a transmittance distribution mask having such a transmittance distribution as to form a plurality of regions respectively having distinct transmittances, said plurality of regions being formed at a predetermined pitch in an in-plane direction of the transmittance distribution mask and for a predetermined wavelength of light; and the pitch is equal to a pitch of lenses of the fly-eye lens multiplied by a magnification of the magnification conversion section.

In this case, the parallel light beam incident on each lens of the fly-eye lens is condensed onto the focal point of the fly-eye lens, and passes through the transmittance distribution mask that is provided on the focal point. With this arrangement, even if misalignment occurs between the center of each lens of the fly-eye lens and the center of each region having a distinct transmittance as long as the amount of misalignment is no greater than the pitch of the micro fly-eye lens multiplied by the magnification of the magnification conversion section. Therefore, the exposed shape of the photosensitive resin layer is not affected by the misalignment. This drastically improves quality of exposure.

It is preferable that the pitch p of the lenses of the fly-eye lens satisfies $p<S \cdot fc/(fm \cdot mb)$, where S is the resolving power on the photosensitive resin layer that depends on the resolution of the photosensitive resin layer and the resolving power of the first microlens array, fc is the focal length of the collimator lens, fm is the focal length of the first microlens array, and mb is the magnification of the magnification conversion section. This arrangement also makes the alignment very easy by widening an allowable range of the pitch p.

It is preferable that the fly-eye lens and the transmittance distribution mask operate in conjunction with each other with respect to the magnification conversion section.

It is preferable that the parallel light beam from the collimator lens is incident on the first microlens array via the aperture member, and the aperture member has an opening whose size corresponds to a size of a microlens array for one chip, so as to expose a plurality of chips by a step-and-repeat method. With this arrangement, exposure can be performed per region of the microlens array corresponding to the size of one chip, even if uniformity of the exposure light cannot be maintained throughout a large region. As a result, all regions can be exposed at high speed and with high accuracy.

It is preferable that the aperture member is disposed in the vicinity of the photosensitive resin layer on the side of the light source. For example, a microlens array for plural chips is disposed on a substrate of a round or square shape, and is processed per wafer. In case of a large substrate (wafer), however, a radiation area of the collimator lens is not large enough to process (expose) the whole substrate at once. Therefore, it is necessary to shut off the light beams incident on the substrate, and to perform step-and-repeat exposure per several chips. In this exposure, it is optimal that the light beams are shut off on the substrate, because such an optical arrangement is adopted that the incident light beams on the substrate at different incident angles are overlapped on the substrate. The light beams can be shut off on the substrate by disposing the aperture member in the vicinity of the photosensitive resin layer on the side of the light source.

It is preferable that the light source emits a parallel light beam. If the light beam incident on the secondary point light source generating section is not a parallel light beam, the directions of the secondary point light sources are varied with respect to the optical axis. This could cause the incident light beams on the substrate to be non-parallel. However, this problem can be prevented with the arrangement above.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An exposing apparatus for a microlens array, comprising:
   a secondary point light source generating section for converting a light beam from a light source into secondary point light sources;
   a luminance adjustment section for receiving light of each secondary point light source and adjusting luminance of the light; and
   a parallel light beam generating section for converting the light with adjusted luminance into a parallel light beam, and guiding the parallel light beam, via a first microlens array which is formed in advance, to a photosensitive resin layer to be a second microlens array.

2. The exposing apparatus for a microlens array as set forth in claim 1, wherein:
   the secondary point light source generating section is a plurality of two-dimensionally disposed optical elements for condensing the light beam from the light source.

3. The exposing apparatus for a microlens array as set forth in claim 2, wherein:
   the secondary point light source generating section is a fly-eye lens.

4. The exposing apparatus for a microlens array as set forth in claim 3, wherein:
   the parallel light beam generating section is a collimator lens; and
   a pitch p of lenses of the fly-eye lens satisfies $p<S\cdot fc/fm$, where S is a resolving power on the photosensitive resin layer that depends on a resolution of the photosensitive resin layer and a resolving power of the first microlens array, fc is a focal length of the collimator lens, and fm is a focal length of the first microlens array.

5. The exposing apparatus for a microlens array as set forth in claim 1, wherein:
   the luminance adjustment section is a transmittance distribution mask having a transmittance distribution for a predetermined wavelength of light.

6. The exposing apparatus for a microlens array as set forth in claim 5, wherein:
   the secondary point light source generating section is a fly-eye lens; and
   the transmittance distribution mask is disposed in a vicinity of a posterior focal point of the fly-eye lens.

7. The exposing apparatus for a microlens array as set forth in claim 5, wherein:
   the transmittance distribution of the transmittance distribution mask is in a form of steps.

8. The exposing apparatus for a microlens array as set forth in claim 5, wherein:
   the transmittance distribution of the transmittance distribution mask has transmittances of at least three levels.

9. The exposing apparatus for a microlens array as set forth in claim 5, wherein:
   the transmittance distribution is such that the transmittance distribution mask has a plurality of regions respectively having distinct transmittances at a predetermined pitch in an in-plane direction of the transmittance distribution mask; and
   the pitch is equal to an integer multiple of a distance between adjacent ones of the secondary point light sources.

10. The exposing apparatus for a microlens array as set forth in claim 1, wherein:
    the parallel light beam generating section is a collimator lens.

11. The exposing apparatus for a microlens array as set forth in claim 10, wherein:
    the collimator lens has an effective diameter Dc given by:

$$Dc=2\cdot fc\cdot NAc+2\cdot fc\cdot \tan \theta i$$

where fc is a focal length of the collimator lens, NAc is an effective numerical aperture of the collimator lens, and $\theta i$ is a maximum incident angle of the parallel light beam incident on the first microlens array from the collimator lens.

12. The exposing apparatus for a microlens array as set forth in claim 10, wherein:
    the photosensitive resin layer is disposed at a posterior focal point of the collimator lens.

13. The exposing apparatus for a microlens array as set forth in claim 10, wherein:
    the parallel light beam from the collimator lens is incident on the first microlens array via an aperture member; and
    when an effective numerical aperture of the collimator lens is NAc including the aperture member, and when a numerical aperture of the fly-eye lens is NAf, NAc<NAf is satisfied.

14. The exposing apparatus for a microlens array as set forth in claim 13, wherein:
    the aperture member is disposed in a vicinity of the photosensitive resin layer on a side of the light source.

15. The exposing apparatus for a microlens array as set forth in claim 13, wherein:
    a center of the aperture member and a center of the photosensitive resin layer lie on an optical axis of the collimator lens; and
    the exposing apparatus further comprises an illuminance adjustment section between the aperture member and the first microlens array.

16. The exposing apparatus for a microlens array as set forth in claim 15, wherein:
    the illuminance adjustment section has a transmittance distribution that is symmetrical with respect to the optical axis; and
    the illuminance adjustment section is a filter for providing uniform illuminance for the incident light.

17. The exposing apparatus for a microlens array as set forth in claim 16, wherein:
    the transmittance distribution of the filter is such that a transmittance increases from a central portion of the filter toward a peripheral portion of the filter.

18. An exposing apparatus for a microlens array as set forth in claim 1, further comprising:
    a magnification conversion section between the secondary point light source generating section and the luminance adjustment section.

19. The exposing apparatus for a microlens array as set forth in claim 18, wherein:
    the magnification conversion section includes a first lens group having a positive refracting power and a second lens group having a positive refracting power;

a distance between a principal point of the first lens group and a principal point of the second lens group is equal to a sum of a focal length of the first lens group and a focal length of the second lens group; and the exposing apparatus further comprises an aperture member, on a posterior focal point of the first lens group, for the magnification conversion section.

20. The exposing apparatus for a microlens array as set forth in claim 19, wherein:

the secondary point light source generating section is a fly-eye lens;

the luminance adjustment section is a transmittance distribution mask having such a transmittance distribution as to form a plurality of regions respectively having distinct transmittances, said plurality of regions being formed at a predetermined pitch in an in-plane direction of the transmittance distribution mask and for a predetermined wavelength of light; and the pitch is equal to a pitch of lenses of the fly-eye lens multiplied by a magnification of the magnification conversion section.

21. The exposing apparatus for a microlens array as set forth in claim 20, wherein:

the transmittance distribution of the transmittance distribution mask is in a form of steps.

22. The exposing apparatus for a microlens array as set forth in claim 20, wherein:

the parallel light beam generating section is a collimator lens; and the pitch p of the lenses of the fly-eye lens satisfies $p < S \cdot fc/(fm \cdot mb)$, where S is a resolving power on the photosensitive resin layer that depends on a resolution of the photosensitive resin layer and a resolving power of the first microlens array, fc is a focal length of the collimator lens, fm is a focal length of the first microlens array, and mb is the magnification of the magnification conversion section.

23. The exposing apparatus for a microlens array as set forth in claim 20, wherein:

the fly-eye lens and the transmittance distribution mask operate in conjunction with each other with respect to the magnification conversion section.

24. The exposing apparatus for a microlens array as set forth in claim 20, wherein:

the parallel light beam generating section is a collimator lens;

the parallel light beam from the collimator lens is incident on the first microlens array via the aperture member; and the aperture member has an opening whose size corresponds to a size of a microlens array for one chip, so as to expose a plurality of chips by a step-and-repeat method.

25. The exposing apparatus for a microlens array as set forth in claim 24, wherein:

the aperture member is disposed in a vicinity of the photosensitive resin layer on a side of the light source.

26. The exposing apparatus for a microlens array as set forth in claim 1, wherein:

the light source emits a parallel light beam.

27. An exposing method for a microlens array, comprising the steps of:

(1) converting a light beam having substantially uniform radiant intensity into secondary point light sources;

(2) adjusting a luminance of light of the secondary point light source, so that the luminance matches a shape of the microlens array to be formed; and (3) converting the light of the secondary point light source into a parallel light beam, the parallel light beam passing through the microlens array to expose a photosensitive resin layer.

28. An exposing method for a microlens array as set forth in claim 27, further comprising the step of:

converting a magnification for the secondary point light source, said step of converting a magnification being carried out between said step (1) and said step (2).

* * * * *